US010859807B2

(12) United States Patent
Shimada

(10) Patent No.: US 10,859,807 B2
(45) Date of Patent: Dec. 8, 2020

(54) INVERTED MICROSCOPE AND SAMPLE OBSERVATION METHOD

(71) Applicant: OLYMPUS CORPORATION, Hachioji (JP)

(72) Inventor: Yoshihiro Shimada, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 137 days.

(21) Appl. No.: 16/196,773

(22) Filed: Nov. 20, 2018

(65) Prior Publication Data

US 2019/0227294 A1 Jul. 25, 2019

(30) Foreign Application Priority Data

Jan. 22, 2018 (JP) .................................. 2018-007796

(51) Int. Cl.
*G02B 21/33* (2006.01)
*G02B 21/26* (2006.01)
*G02B 21/00* (2006.01)
*G02B 21/02* (2006.01)

(52) U.S. Cl.
CPC ......... *G02B 21/33* (2013.01); *G02B 21/0088* (2013.01); *G02B 21/02* (2013.01); *G02B 21/26* (2013.01)

(58) Field of Classification Search
CPC .... G02B 21/33; G02B 21/26; G02B 21/0088; G02B 21/02
See application file for complete search history.

(56) References Cited

U.S. PATENT DOCUMENTS

| | | | |
|---|---|---|---|
| 7,327,514 B2 | 2/2008 | Uhl et al. | |
| 7,619,829 B2 | 11/2009 | Okazaki et al. | |
| 7,961,384 B2 | 6/2011 | Pirsch | |
| 8,199,407 B2 | 6/2012 | Liebel et al. | |
| 2006/0274424 A1 | 12/2006 | Okazaki et al. | |
| 2009/0109416 A1* | 4/2009 | Dougherty .......... | G03F 7/70341 355/67 |
| 2010/0027109 A1 | 2/2010 | Liebel et al. | |
| 2015/0015943 A1 | 1/2015 | Scheps et al. | |

FOREIGN PATENT DOCUMENTS

| | | |
|---|---|---|
| EP | 1703311 A1 | 9/2006 |
| JP | 4253592 B2 | 4/2009 |
| JP | 5597868 B2 | 8/2014 |

* cited by examiner

*Primary Examiner* — Wen Huang
(74) *Attorney, Agent, or Firm* — Holtz, Holtz & Volek PC

(57) ABSTRACT

An inverted microscope includes a stage supporting a bottom member; an immersion objective disposed facing vertically upward such that a distal end thereof faces a bottom face of the bottom member; an alignment unit moving the stage or the immersion objective in an optical-axis direction of the immersion objective; a liquid injecting unit injecting liquid between the bottom face and the distal end; and a controller controlling the liquid injecting unit, in a state where the bottom face and the distal end are disposed with a gap therebetween, to inject the liquid onto the distal end to form a droplet, and controlling the alignment unit to bring the bottom member and the immersion objective closer to each other to bring the droplet into contact with the bottom face, thereby forming a liquid column, and moving the stage and the immersion objective relative to each other while maintaining the liquid column.

8 Claims, 7 Drawing Sheets

INVERTED MICROSCOPE AND SAMPLE OBSERVATION METHOD

CROSS-REFERENCE TO RELATED APPLICATIONS

This application is based on Japanese Patent Application No. 2018-007796, the content of which is incorporated herein by reference.

TECHNICAL FIELD

The present invention relates to inverted microscopes and sample observation methods.

BACKGROUND ART

Recently, there are interests in the method of acquiring microscopic image data of 3D cultured cells, such as spheroid or organoid, performing screening by using image analysis techniques, and evaluating medical effects. Furthermore, recently, there are demands for analyzing organelles in individual cells constituting 3D cultured cells, which naturally requires images having high resolutions. In order to meet this requirement for higher resolutions, there are strong demands for using immersion objectives having large NAs and having working distances large enough to enable the observation of the entire 3D cultured cells. Furthermore, in order to realize screening, it is necessary to automate liquid injection between the bottom face of a container that accommodates a sample, such as a microplate, and the distal-end lens of an immersion objective. Thus, there are strong demands for comprehensive automation of microscope systems as well as immersion objectives having large NAs and large working distances.

There are known existing technologies for realizing utilization of immersion objectives and automation of liquid injection (e.g., see Patent Literatures 1 to 4). However, with the technologies of Patent Literatures 1 to 3, the sample to be observed is a thin sample, such as monolayer cultured cells, and what is formed of liquid between the distal-end lens of an immersion objective and the bottom face of a sample container is an "immersion film". Thus, it is obvious that the use of an immersion objective having a working distance large enough to enable the observation of an entire sample having a large thickness, such as organoid, is not intended in the technologies in Patent Literatures 1 to 3. Furthermore, Patent Literatures 1 to 3 do not describe anything about a means for forming a liquid column having a considerable height between the distal-end lens of an immersion objective and the bottom face of a bottom portion of a sample container.

Furthermore, Patent Literature 4 describes bringing an immersion objective closer to a container accommodating a sample after supplying liquid onto a distal-end lens. However, with this method alone, it is not possible to use an objective having a focal position at a position higher than the height of a droplet that is formed on the distal-end lens.

Meanwhile, there is a known technology in which an immersion objective having a focal position at a position higher than the height of a droplet on a distal-end lens (e.g., see Patent Literature 5).

CITATION LIST

Patent Literature

{PTL 1}
  Specification of U.S. Pat. No. 7,961,384
{PTL 2}
  Specification of United States Patent Application, Publication No. 2015/0015943
{PTL 3}
  Publication of Japanese Patent No. 5597868
{PTL 4}
  Publication of Japanese Patent No. 4253592
{PTL 5}
  Specification of U.S. Pat. No. 7,327,514

Solution to Problem

A first aspect of the present invention is an inverted microscope including a retaining unit configured to support a bottom member and capable of retaining a sample above the bottom member, the bottom member being optically transparent; an immersion objective disposed facing vertically upward such that the distal end thereof faces the bottom face of the bottom member supported by the retaining unit; an alignment unit configured to move at least one of the retaining unit and the immersion objective in an optical-axis direction extending along the optical axis of the immersion objective; a liquid injecting unit configured to inject liquid between the bottom face of the bottom member and the distal end of the immersion objective; and a control unit configured to control the liquid injecting unit in a state where the bottom face of the bottom member and the distal end of the immersion objective are disposed with a gap therebetween in the optical-axis direction greater than the height of a droplet that can be formed on the distal end, with the aim of injecting the liquid onto the distal end to form the droplet, and to control the alignment unit with the aim of relatively bringing the bottom member and the immersion objective closer to each other in the optical-axis direction to bring the droplet on the distal end into contact with the bottom face of the bottom member, thereby forming a liquid column constituted of the liquid being in contact with the distal end and the bottom face, and moving the retaining unit and the immersion objective relative to each other in the optical-axis direction while maintaining the liquid column.

A second aspect of the present invention is an inverted microscope including a retaining unit configured to support a bottom member and capable of retaining a sample above the bottom member, the bottom member being optically transparent; an immersion objective disposed facing vertically upward such that the distal end thereof faces the bottom face of the bottom member supported by the retaining unit; an alignment unit configured to move at least one of the retaining unit and the immersion objective in an optical-axis direction extending along the optical axis of the immersion objective; a liquid injecting unit configured to inject liquid between the bottom face of the bottom member and the distal end of the immersion objective; and a control unit configured to control the liquid injecting unit in a state where the bottom face of the bottom member and the distal end of the immersion objective are disposed with a gap therebetween in the optical-axis direction less than the height of a droplet that can be formed on the distal end, with the aim of injecting the liquid onto the distal end to form a liquid column constituted of the liquid being in contact with the distal end and the bottom face, and to control the alignment unit with the aim of moving the retaining unit and the immersion objective relative to each other in the optical-axis direction while maintaining the liquid column.

A third aspect of the present invention is a sample observation method including a droplet forming step of, in a state where a bottom member that retains a sample thereabove and that is optically transparent and an immersion objective that is disposed facing vertically upward with the distal end thereof facing the bottom face of the bottom member are disposed with a gap therebetween greater than the height of a droplet that can be formed on the distal end of the immersion objective, injecting liquid onto the distal end to form the droplet; a liquid-column forming step of relatively bringing the bottom member and the immersion objective closer to each other in an optical-axis direction extending along the optical axis of the immersion objective to bring the droplet formed on the distal end into contact with the bottom face of the bottom member, thereby forming a liquid column constituted of the liquid being in contact with the distal end and the bottom face; and a focal-position adjusting step of moving the bottom member and the immersion objective relative to each other in the optical-axis direction, while maintaining the liquid column, to adjust the focal position of the immersion objective on the sample retained above the bottom member.

A fourth aspect of the present invention is a sample observation method including a liquid-column forming step of, in a state where a bottom member that retains a sample thereabove and that is optically transparent and an immersion objective that is disposed facing vertically upward with the distal end thereof facing the bottom face of the bottom member are disposed with a gap therebetween less than the height of a droplet that can be formed on the distal end of the immersion objective, injecting liquid onto the distal end to form a liquid column constituted of the liquid being in contact with the distal end and the bottom face of the bottom member; and a focal-position adjusting step of moving the bottom member and the immersion objective relative to each other in an optical-axis direction extending along the optical axis of the immersion objective, while maintaining the liquid column, to adjust the focal position of the immersion objective on the sample retained above the bottom member.

DESCRIPTION OF EMBODIMENTS

First Embodiment

Figure 1:
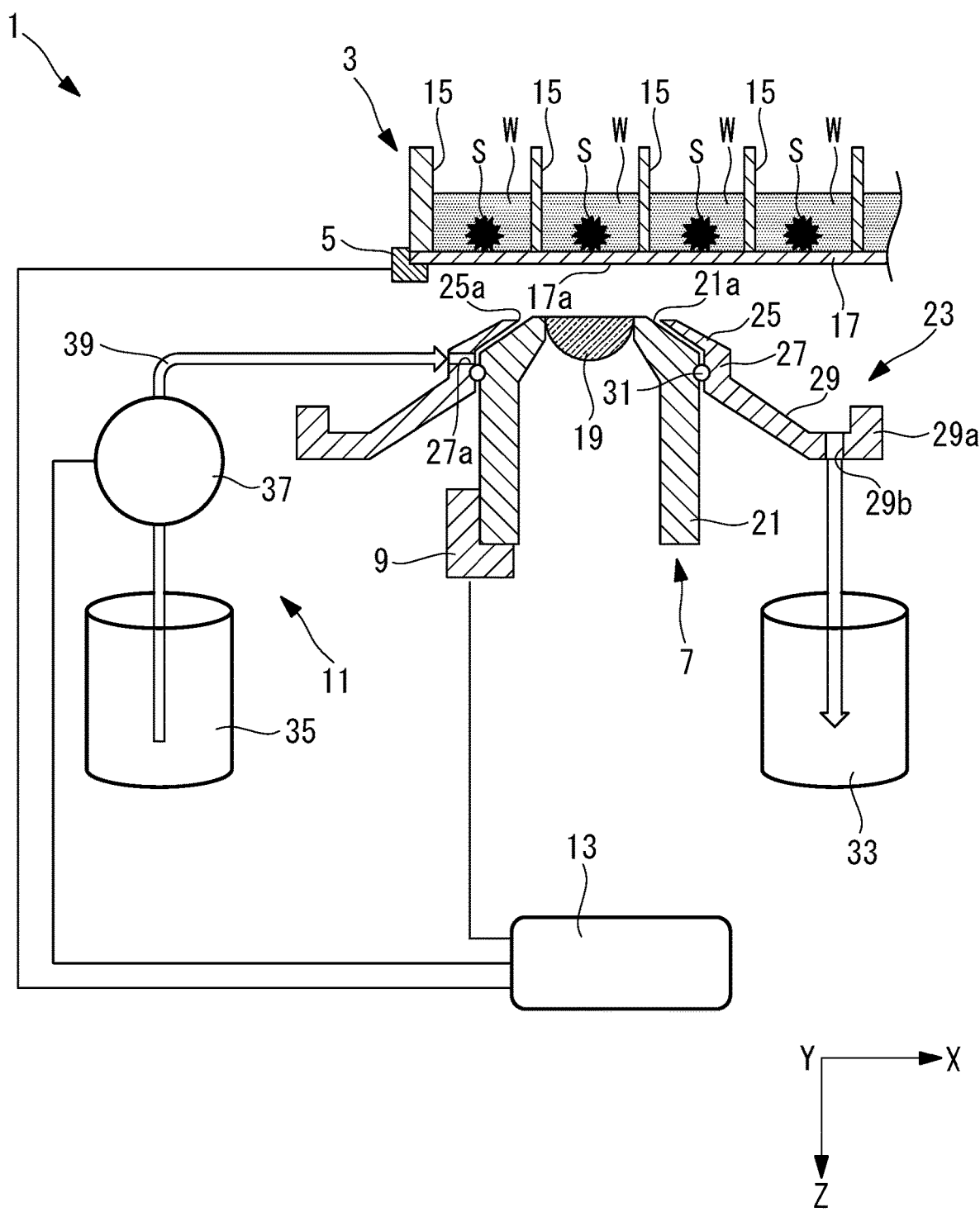
FIG. 1 is a schematic illustration showing the configuration of an inverted microscope according to a first embodiment of the present invention.

An inverted microscope and a sample observation method according to a first embodiment of the present invention will be described below with reference to the drawings.

An inverted microscope 1 according to this embodiment includes an XY stage (retaining unit) 5 that supports a multi-well plate 3; an immersion objective 7 disposed under the multi-well plate 3 supported by the XY stage 5; an alignment unit 9 that moves the immersion objective 7 in the direction along the optical axis thereof (optical-axis direction); a liquid injecting device (liquid injecting unit) 11 that injects liquid between the multi-well plate 3 and the immersion objective 7; and a controller (control unit) 13 that controls the XY stage 5, the alignment unit 9, and the liquid injecting device 11. Hereinafter, the direction along the optical axis of the immersion objective 7 is considered as the Z direction, and the directions perpendicular to the Z direction and orthogonal to each other are considered as the X direction and the Y direction.

The multi-well plate 3 has, for example, the shape of a rectangular parallelepiped box having a plurality of wells 15 that are arrayed linearly. The multi-well plate 3 is configured such that it is possible to accommodate samples S together with a transparent solution W in the individual wells 15. Furthermore, in the multi-well plate 3, at least a bottom portion (bottom member) 17 is formed of an optically transparent material. The bottom portion 17 constitutes the bottom portions of the individual wells 15.

As the samples S, it is possible to adopt arbitrary 3D cultured cells, such as spheroid or organoid.

The XY stage 5 is able to retain the samples S above the bottom portion 17 of the multi-well plate 3 by supporting the multi-well plate 3 accommodating the samples S in the wells 15. The XY stage 5 is configured to be movable to an arbitrary position in the XY directions by means of a linear movement mechanism constituted of motors, ball screws, etc., which are not shown. As the XY stage 5 is moved in the XY directions, the multi-well plate 3 supported by the XY stage 5 is moved in the XY directions. Alternatively, the XY stage 5 may be configured so as to be manually movable.

The immersion objective 7 is constituted of a combination of a large number of lenses, and has a cylindrical casing 21 that holds the large number of lenses. In relation to this embodiment, a distal-end lens 19 among the large number of lenses is shown and will be described.

The casing 21 holds the distal-end lens 19 at the distal end thereof in the optical-axis direction. The lens surface of the distal-end lens 19 constitutes the distal end of the immersion objective 7. The casing 21, on the distal-end side thereof in the optical-axis direction, has a tapered face 21a that is gradually tapered toward the distal-end lens 19. The surface of the tapered face 21a is treated to have water repellency with fluororesin coating or the like.

Furthermore, the immersion objective 7 is disposed facing vertically upward such that the distal-end lens 19 faces the bottom face 17a of the bottom portion 17 of the multi-well plate 3. The immersion objective 7 is configured to be able to retain liquid (immersion liquid), by surface tension, between the bottom face 17a of the bottom portion 17 of the multi-well plate 3 and the distal-end lens 19.

Furthermore, with the immersion objective 7, the distance from the distal-end lens 19 to the focal position is longer than the height of a droplet F (see FIG. 3) formed on the distal-end lens 19; for example, the distance from the distal-end lens 19 to the focal position is not less than 1.5 mm.

Furthermore, the immersion objective 7 is provided with a ring-shaped cap 23 made of a thin, plate-shaped member, put on the tapered face 21a of the casing 21. The cap 23 includes a cover section 25 covering the tapered face 21a of the casing 21; a middle section 27 extending from the cover section 25 to the outer circumferential face of the casing 21 in the optical-axis direction; and a projected section 29 projected outward in the radial direction from the middle section 25 while being slanted to the proximal-end side of the casing 21.

The cover section 25, at the center thereof, has an opening 25a where the distal-end lens 19 is exposed. Furthermore, the cover section 25 has an inner face that is slanted following the tapered face 21a of the casing 21, and is disposed with a slight gap between the inner face of the cover section 25 and the tapered face 21a. Similarly to the tapered face 21a of the casing 21, the inner face of the cover section 25 is treated to have water repellency.

An O-ring 31 is disposed between the inner circumferential face of the middle section 27 and the outer circumferential face of the casing 21. The O-ring 21 seals, in a liquid-tight manner, the entire circumference of the gap between the inner circumferential face of the middle section 27 and the outer circumferential face of the casing 21. The middle section 27, above the O-ring 31, has formed therein a liquid injecting hole 27a penetrating the middle section 27 in the thickness direction thereof.

The projected section 29 has an outer edge portion 29a provided along the entire circumference and rising in the optical-axis direction so that the outer edge portion 29a can stop liquid that overflows off from the surface of the distal-end lens 19 and that flows to the projected section 29 via the external surface of the cover section 25. Furthermore, the projected section 29, in the vicinity of the outer edge portion 29a, has a liquid discharge hole 29b for discharging the liquid stopped by the outer edge portion 29a. The liquid discharged from the liquid discharge hole 29b is stored in a discharged-liquid tank 33.

The liquid injecting device 11 includes a liquid injecting tank 25 that stores liquid, a peristaltic pump (driving source 37) that sucks up the liquid stored in the liquid injecting tank 25; and a tube 39 having one end thereof connected to the liquid injecting hole 27a of the cap 23 and having the other end thereof connected to the peristaltic pump 37.

The liquid injecting device 11 is configured to be able to eject, from one end of the tube 39, the liquid sucked up from the liquid injecting tank 35 by the peristaltic pump 37. This enables the liquid injecting device 11 to inject the liquid from the liquid injecting hole 27a of the cap 23 onto the distal-end lens 19 of the immersion objective 7 via the gap between the inner surface of the cover section 25 and the tapered face 21a of the casing 21, thereby forming a droplet F on the distal-end lens 19.

Because the tapered face 21a of the casing 21 and the inner surface of the cover section 25 are treated to have water repellency, as long as there is no spatial restriction above the distal-end lens 19, it is possible to form a large droplet F on the distal-end lens 19. Furthermore, the liquid injecting device 11 is also configured to be able to suck the liquid on the distal-end lens 19 from one end of the tube 39 and return the liquid to the liquid injecting tank 35 by driving the peristaltic pump 37 to perform an operation that is the reverse of the liquid injecting operation.

The controller 13 includes, for example, a central processing unit (CPU), a read-only memory (ROM), a main storage unit such as a random access memory (RAM), an auxiliary storage unit such as a hard disk drive (HDD), an output unit that outputs data, an external interface that sends and receives data to and from external devices, etc. (these components are not shown). The auxiliary storage unit stores various programs. Various kinds of processing are realized by the CPU loading the programs from the auxiliary storage unit into the main storage unit such as a RAM and executing the programs.

Specifically, by executing a liquid injecting program, the controller 13 controls the alignment unit 9 with the aim of disposing the bottom face 17a of the bottom portion 17 of the multi-well plate 3 and the distal-end lens 19 of the immersion objective 7 with a gap in the optical-axis direction greater than the height of a droplet F that can be formed on the distal-end lens 19, and then controls the liquid injecting device 11 with the aim of injecting liquid onto the distal-end lens 19 and thereby forming a droplet F.

Furthermore, by executing a focal-position adjusting program, the controller 13 controls the alignment unit 9 with the aim of bringing the bottom portion 17 of the multi-well plate 3 and the distal-end lens 19 of the immersion objective 7 relatively closer to each other in the optical-axis direction to bring the droplet F on the distal-end lens 19 into contact with the bottom face 17a of the bottom portion 17 of the multi-well plate 3, thereby forming a liquid column constituted of the liquid being in contact with the distal-end lens 19 and the bottom face 17a, and then moving the immersion objective 7 in the optical-axis direction while maintaining the liquid column between the distal-end lens 19 and the bottom face 17a. Furthermore, the controller 13 controls the liquid injecting device 11 with the aim of replenishing the liquid onto the distal-end lens 19 while moving the immersion objective 7 in the optical-axis direction while maintaining the liquid column being in contact with the distal-end lens 19 and the bottom face 17a. Hereinafter, the liquid column constituted of the liquid being in contact with the distal-end lens 19 and the bottom face 17a will be designated by the same reference sign F as the droplet F.

Figure 2:
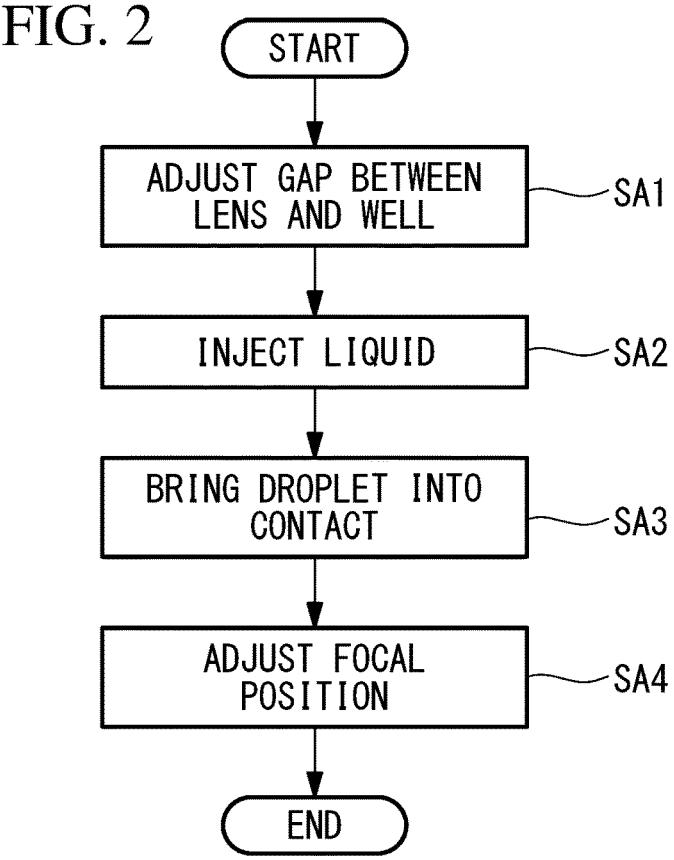
FIG. 2 is a flowchart for explaining a sample observation method according to the first embodiment of the present invention.

Referring next to the flowchart in FIG. 2, the sample observation method according to this embodiment includes a gap adjusting step (droplet forming step) SA1 of adjusting the position of the immersion objective 7 in the optical-axis direction to dispose the bottom portion 17 of the multi-well plate 3 accommodating the samples S in the individual wells 15 and the immersion objective 7 with a gap therebetween greater than the height of a droplet F that can be formed on the distal-end lens 19 of the immersion objective 7; a liquid injecting step (droplet forming step) SA2 of injecting liquid onto the distal-end lens 19 to form a droplet F in the state where the position of the immersion objective 7 in the optical-axis direction has been adjusted through the gap adjusting step; a liquid-column forming step SA3 of bringing the bottom face 17a of the bottom portion 17 of the multi-well plate 3 and the distal-end lens 19 of the immersion objective 7 relatively closer to each other in the optical-axis direction to bring the droplet F formed on the distal-end lens 19 into contact with the bottom face 17a of the bottom portion 17 of the multi-well plate 3, thereby forming a liquid column F; and a focal-position adjusting step SA4 of moving the immersion objective 7 in the optical-axis direction, while maintaining the liquid column F between the distal-end lens 19 and the bottom face 17a, to adjust the focal position of the immersion objective 7 on the sample S accommodated in one of the wells 15.

The operation of the thus-configured inverted microscope 1 and sample observation method will be described with reference to the flowchart in FIG. 2.

Figure 3:
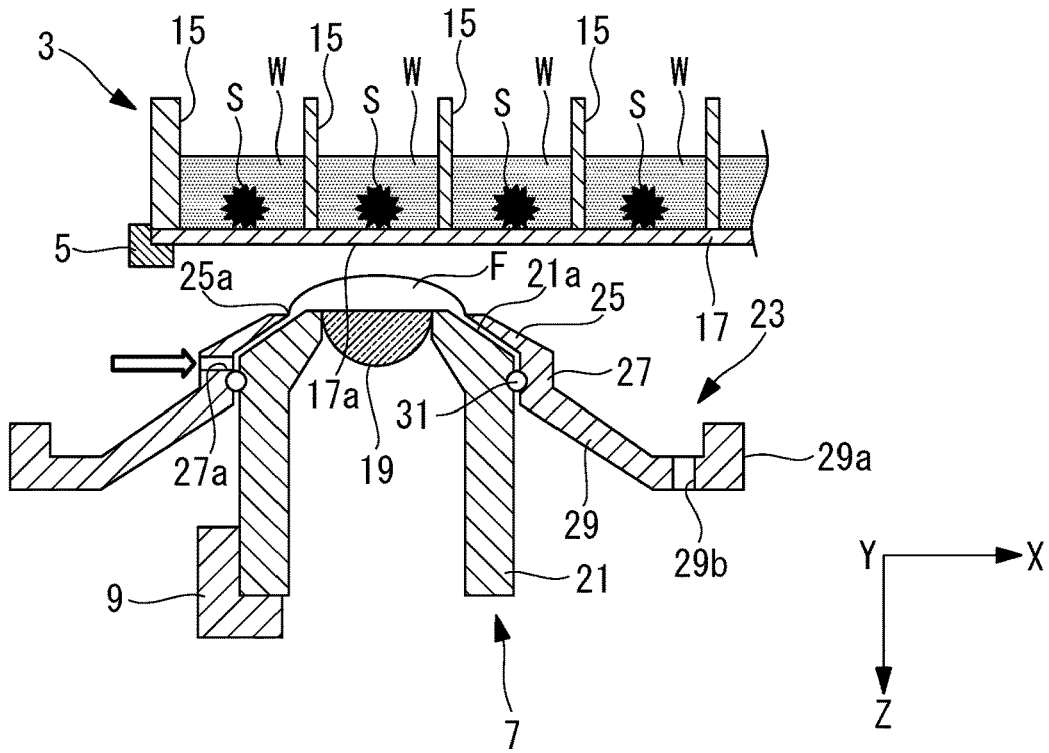
FIG. 3 is a vertical sectional view of a multi-well plate and an immersion objective in FIG. 1, showing a state in which a bottom portion of the multi-well plate and the immersion objective are disposed with a gap therebetween in the optical-axis direction and in which a droplet is formed on a distal-end lens.

In the case where samples S are observed by using the inverted microscope 1 and the sample observation method according to this embodiment, first, the controller 13 controls the alignment unit 9 to move the immersion objective 7 in the optical-axis direction so as to dispose the bottom portion 17 of the wells 15 of the multi-well plate 3, in which the samples S to be observed are accommodated, and the distal-end lens 19 of the immersion objective 7 with a gap therebetween greater than the height of a droplet F to be formed on the distal-end lens 19, as shown in FIG. 3 (step SA1).

Then, the controller 13 controls the liquid injecting device 11 to eject, from one end of the tube 39, the liquid sucked up from the liquid injecting tank 35 by the peristaltic pump 37. The liquid ejected from one end of the tube 39 is injected onto the distal-end lens 19 from the liquid injecting hole 27a of the cap 23 via the gap between the inner surface of the cover section 25 and the tapered face 21a of the casing 21. Thus, a droplet F is formed on the distal-end lens 19 (step SA2). At this stage, the droplet F formed on the distal-end lens 19 is not in contact with the bottom face 17a of the bottom portion 17 of the multi-well plate 3.

Figure 4:
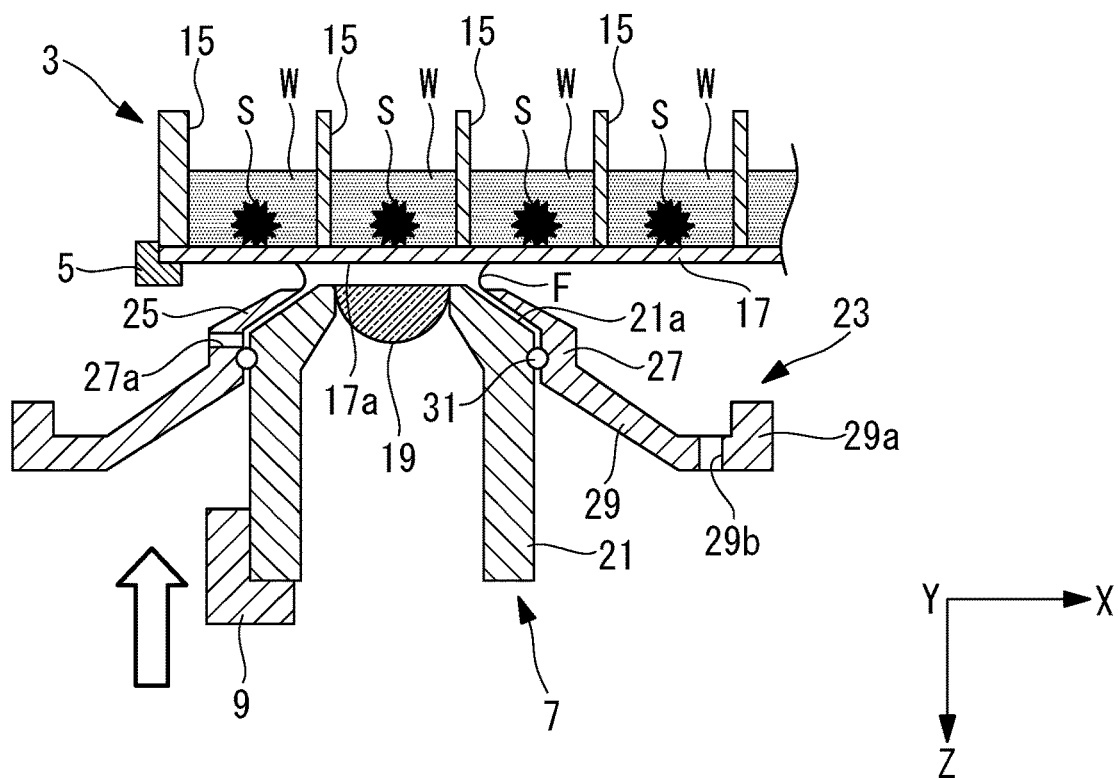
FIG. 4 is a vertical sectional view of the multi-well plate and the immersion objective, showing a state in which, from the state in FIG. 3, the multi-well plate and the immersion objective are brought closer to each other to bring the droplet on the distal-end lens into contact with the bottom face of the bottom portion of the multi-well plate, whereby a liquid column is formed.

Then, the controller 13 controls the alignment unit 9 to move the immersion objective 7 in the direction closer to the multi-well plate 3 until the droplet F formed on the distal-end lens 19 comes into contact with the bottom face 17a of the bottom portion 17 of the multi-well plate 3, whereby a liquid column F is formed, as shown in FIG. 4 (step SA3).

Figure 5:
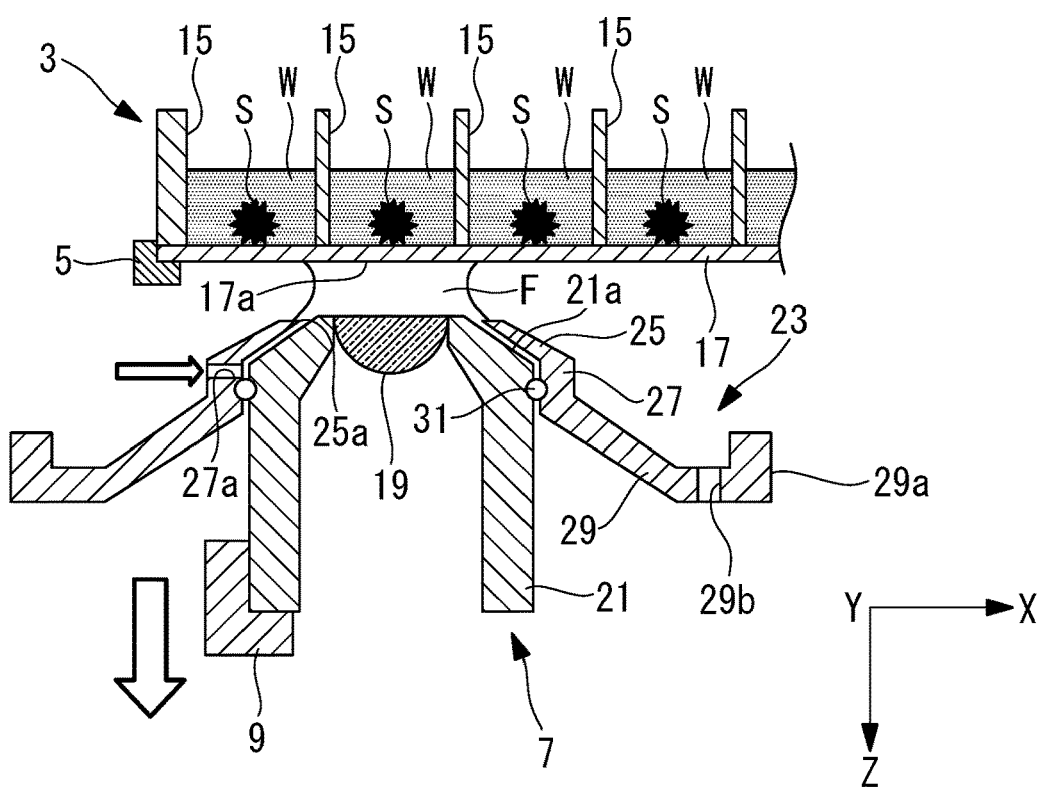
FIG. 5 is a vertical sectional view of the multi-well plate and the immersion objective, showing how the focal position is adjusted by moving the immersion objective away from the multi-well plate from the state in FIG. 4 while maintaining the liquid column.

Then, when the droplet F on the distal-end lens 19 has come into contact with the bottom face 17a of the bottom portion 17 of the multi-well plate 3, whereby the liquid column F is formed, the controller 13 controls the alignment unit 9 and the liquid injecting device 11 to move the immersion objective 7 in the direction away from the multi-well plate 3, while replenishing the liquid onto the distal-end lens 19 from the liquid injecting hole 27a of the cap 23, as shown in FIG. 5. Then, while maintaining the liquid column F between the distal-end lens 19 and the bottom face 17a, the immersion objective 7 is moved in the direction away from or in the direction closer to the multi-well plate 3 to adjust the position of the immersion objective 7 in the optical-axis direction, whereby the focal position of the immersion objective 7 is adjusted on the sample S accommodated in one of the wells 15 (step SA4). Thus, light emitted from the focal position of the immersion objective 7 at the sample S is transmitted through the liquid column F filling the gap between the bottom portion 17 of the multi-well plate 3 and the distal-end lens 19 and is collected by the immersion objective 7, which enables the observation of the sample S.

As described above, with the inverted microscope 1 and the sample observation method according to this embodiment, it is possible to attain a desired alignment precision with a simple structure and simple operations of just moving the immersion objective 7 in the optical-axis direction by the alignment unit 9 and injecting liquid between the bottom portion 17 of the multi-well plate 3 and the distal-end lens 19 of the immersion objective 7 by the liquid injecting device 11, which enables the observation of 3D cultured cells having a considerable thickness, such as spheroid or organoid.

Furthermore, in the state where the droplet F on the distal-end lens 19 is in contact with the bottom face 17a of the bottom portion 17 of the multi-well plate 3, the retaining force increases compared with the case where the droplet F is held just with the distal-end lens 19, which increases the amount of liquid that may be contained in the liquid column F. Thus, by replenishing the liquid onto the distal-end lens 19 while moving the immersion objective 7 in the optical-axis direction, it is possible to observe the sample S with a sufficient amount of liquid column F provided between the bottom portion 17 of the multi-well plate 3 and the distal-end lens 19.

Second Embodiment

Next, an inverted microscope and a sample observation method according to a second embodiment of the present invention will be described.

The inverted microscope 1 according to this embodiment is configured the same as that in the first embodiment, as shown in FIG. 1; however, this embodiment differs from the first embodiment in how the controller 13 controls the alignment unit 9 and the liquid injecting device 11.

Hereinafter, parts configured the same as those of the inverted microscope 1 according to the first embodiment are denoted by the same reference signs, and descriptions thereof will be omitted.

In this embodiment, by executing a liquid injecting program, the controller 13 controls the alignment unit 9 with the aim of disposing the bottom face 17a of the bottom portion 17 of the multi-well plate 3 and the distal-end lens 19 of the immersion objective 7 with a gap therebetween in the optical-axis direction less than the height of the droplet F, and then controls the liquid injecting device 11 with the aim of injecting liquid onto the distal-end lens 19 to form a liquid column F.

Furthermore, by executing a focal-position adjusting program, the controller 13 controls the alignment unit 9 with the aim of moving the immersion objective 7 in the optical-axis direction while maintaining the liquid column F between the distal-end lens 19 and the bottom face 17a. Furthermore, the controller 13 controls the liquid injecting device 11 with the aim of replenishing the liquid onto the distal-end lens 19 while moving the immersion objective 7 in the optical-axis direction while maintaining the liquid column F between the distal-end lens 19 and the bottom face 17a.

Figure 6:
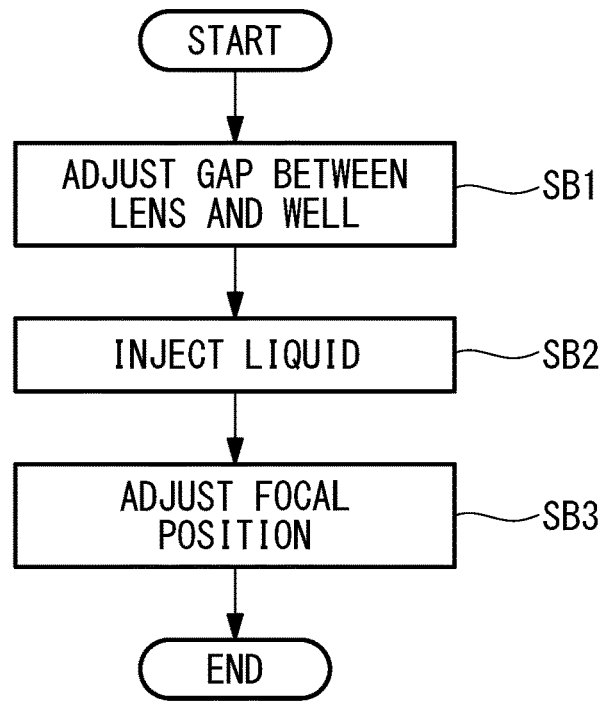
FIG. 6 is a flowchart for explaining a sample observation method according to a second embodiment of the present invention.

Referring next to the flowchart in FIG. 6, the sample observation method according to this embodiment includes a gap adjusting step (droplet forming step) SB1 of adjusting the position of the immersion objective 7 in the optical-axis direction to dispose the bottom portion 17 of the wells 15 accommodating the samples S of the multi-well plate 3 and the distal-end lens 19 of the immersion objective 7 with a gap therebetween less than the height of a droplet F that can be formed on the distal-end lens 19; a liquid injecting step (liquid-column forming step) SB2 of injecting liquid onto the distal-end lens 19 in the state where the position of the immersion objective 7 in the optical-axis direction has been adjusted through the gap adjusting step SB1, thereby forming a liquid column F constituted of the liquid being in contact with the distal-end lens 19 and the bottom face 17a of the bottom portion 17 of the multi-well plate 3; and a focal-position adjusting step SB3 of moving the immersion objective 7 in the optical-axis direction, while maintaining the liquid column F between the distal-end lens 19 and the bottom face 17a, to adjust the focal position of the immersion objective 7 on the sample S accommodated in one of the wells 15.

The operation of the thus-configured inverted microscope 1 and sample observation method will be described with reference to the flowchart in FIG. 6.

Figure 7:
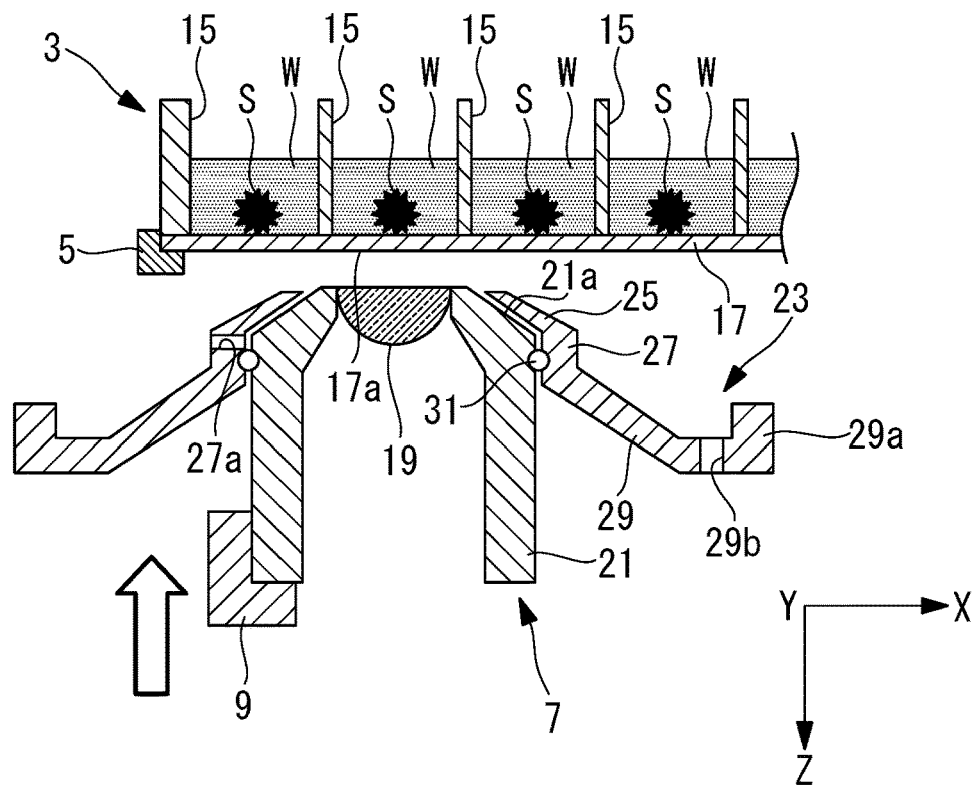
FIG. 7 is a vertical sectional view of the multi-well plate and the immersion objective, showing a state in which the bottom portion of the multi-well plate and the immersion objective are disposed close to each other in the optical-axis direction.

In the case where samples S are observed by using the inverted microscope 1 and the sample observation method according to this embodiment, first, the controller 13 controls the alignment unit 9 to move the immersion objective 7 in the optical-axis direction so as to dispose the bottom portion 17 of the wells 15 of the multi-well plate 3, in which the samples S are accommodated, and the immersion objective 7 with a gap therebetween less than the height of a droplet F that can be formed on the distal-end lens 19, as shown in FIG. 7 (step SB1).

Figure 8:
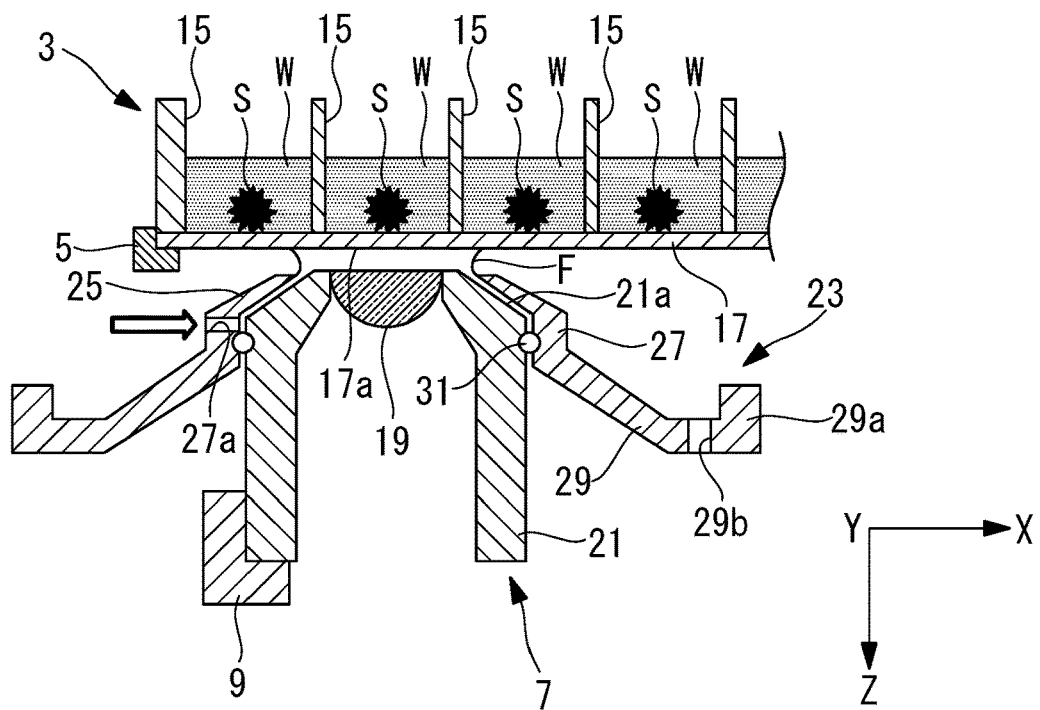
FIG. 8 is a vertical sectional view of the multi-well plate and the immersion objective, showing a state in which, from the state in FIG. 7, a liquid column being in contact with the bottom face of the bottom portion of the multi-well plate has been formed on the distal-end lens of the immersion objective.

Then, the controller 13 controls the liquid injecting device 11 to eject, from one end of the tube 39, the liquid sucked up from the liquid injecting tank 35 by the peristaltic pump 37. The liquid ejected from one end of the tube 39 is injected onto the distal-end lens 19 from the liquid injecting hole 27a of the cap 23 via the gap between the inner surface of the cover section 25 and the tapered face 21a of the casing 21, as shown in FIG. 8. Thus, a liquid column F that is in contact with the bottom face 17a of the bottom portion 17 of the multi-well plate 3 is formed on the distal-end lens 19 (step SB2).

Figure 9:
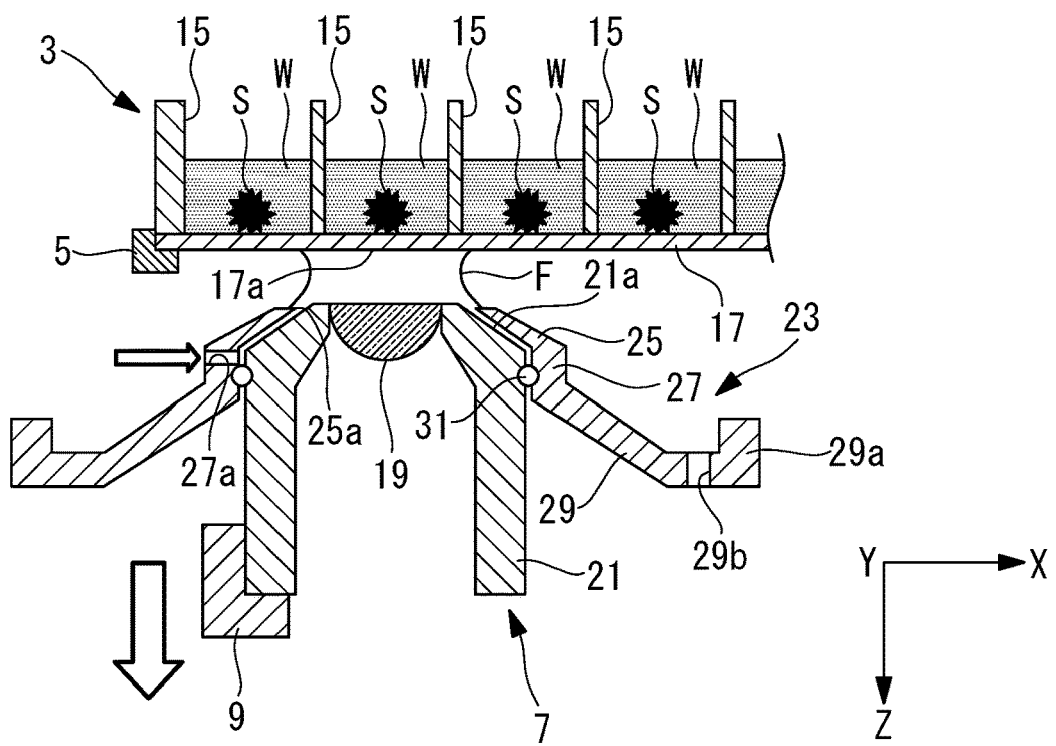
FIG. 9 is a vertical sectional view of the multi-well plate and the immersion objective, showing how the focal position is adjusted by moving the immersion objective away from the multi-well plate from the state in FIG. 8 while maintaining the liquid column.

Then, the controller 13 controls the alignment unit 9 and the liquid injecting device 11 to move the immersion objective 7 in the direction away from the multi-well plate 3, while replenishing the liquid onto the distal-end lens 19 from the liquid injecting hole 27a of the cap 23, as shown in FIG. 9. Then, while maintaining the liquid column F between the distal-end lens 19 and the bottom face 17a, the immersion objective 7 is moved in the direction away from or in the direction closer to the multi-well plate 3 to adjust the position of the immersion objective 7 in the optical-axis direction, whereby the focal position of the immersion objective 7 is adjusted on the sample S accommodated in one of the wells 15 (step SB3). Thus, light emitted from the focal position of the immersion objective 7 at the sample S is transmitted through the liquid column F filling the gap between the bottom portion 17 of the multi-well plate 3 and the distal-end lens 19 and is collected by the immersion objective 7, which enables the observation of the sample S.

As described above, with the inverted microscope 1 and the sample observation method according to this embodiment, it is possible to attain a desired alignment precision with a simple structure and simple operations of just moving the immersion objective 7 in the optical-axis direction and injecting liquid between the bottom portion 17 of the multi-well plate 3 and the distal-end lens 19 of the immersion objective 7, which enables the observation of 3D cultured cells having a considerable thickness, such as spheroid or organoid.

Furthermore, it is possible to form a liquid column F while retaining the liquid column F with both of the distal-end lens 19 of the immersion objective 7 and the bottom face 17a of the bottom portion 17 of the multi-well plate 3, and thus it is possible to obtain a greater retaining force compared with the case where a droplet F is formed, which is retained only by the distal-end lens 19. Therefore, it is possible to increase the amount of liquid that is injected onto the distal-end lens 19, thereby forming a sufficient amount of liquid column F between the bottom portion 17 of the multi-well plate 3 and the immersion objective 7.

Furthermore, by replenishing the liquid onto the distal-end lens 19 while moving the immersion objective 7 in the optical-axis direction, it is possible to observe the sample S with a sufficient amount of liquid column F provided between the bottom portion 17 of the multi-well plate 3 and the distal-end lens 19.

In the embodiments described above, liquid is replenished onto the distal-end lens 19 while moving the immersion objective 7 in the optical-axis direction while maintaining the liquid column F between the distal-end lens 19 and the bottom face 17a. However, it is not necessarily required to replenish liquid, and instead of replenishing liquid, the immersion objective 7 may be moved away from the multi-well plate 3 so as to extend the liquid column F in the optical-axis direction by surface tension. The necessity of liquid replenishment is determined on the basis of the working distance of the immersion objective 7, the surface tension of the liquid, the wettability of the surfaces of members in the periphery of the distal-end lens 19 and the surface of the distal-end portion of the cap 23 with the liquid, etc.

Alternatively, instead of replenishing liquid while moving the immersion objective 7, liquid may be replenished onto the distal-end lens 19 before moving the immersion objective 7, or liquid may be replenished onto the distal-end lens 19 before moving the immersion objective 7 and also while moving the immersion objective 7.

Furthermore, in the embodiments described above, the liquid on the distal-end lens 19 is discharged by utilizing gravity. Alternatively, a pump for discharging the liquid may be connected to the liquid discharge hole 29b of the cap 23. Yet alternatively, a liquid discharging device that sucks the liquid from the distal-end lens 19 and discharges the sucked liquid may be provided separately from the liquid injecting device 11.

The embodiments described above may be modified as follows.

Figure 10:
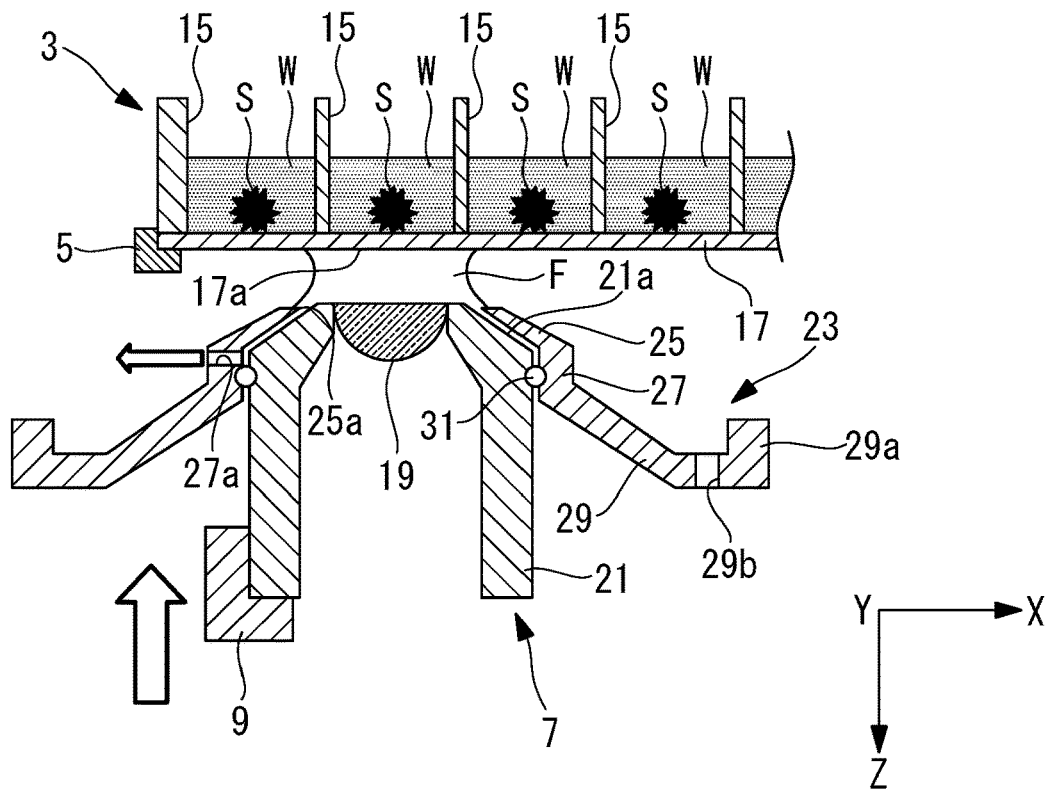
FIG. 10 is a vertical sectional view of the multi-well plate and the immersion objective, showing how the amount of liquid column on the distal-end lens is reduced while bringing the multi-well plate and the immersion objective closer to each other.

As a first modification, in the case where the controller 13 controls the alignment unit 9 to move the immersion objective 7 in the optical-axis direction so as to bring the bottom portion 17 of the multi-well plate 3 and the distal-end lens 19 closer to each other, while maintaining the liquid column F between the distal-end lens 19 and the bottom face 17a, as shown in FIG. 10, the controller 13 may control the liquid injecting device 11 to suck the liquid so as to reduce the amount of the liquid column F on the distal-end lens 19 in accordance with the position of the immersion objective 7 in the optical-axis direction.

Figure 11:
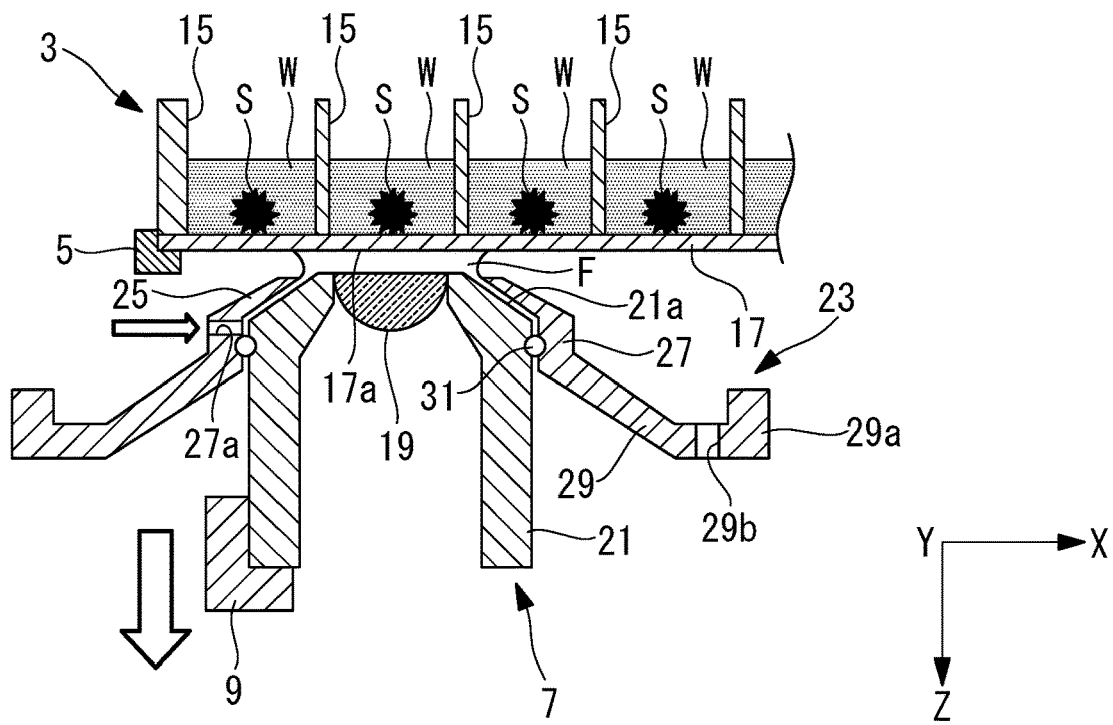
FIG. 11 is a vertical sectional view of the multi-well plate and the immersion objective, showing how liquid is replenished onto the distal-end lens while relatively moving the multi-well plate and the immersion objective away from each other.

Meanwhile, in the case where the controller 13 controls the alignment unit 9 to move the immersion objective 7 in the optical-axis direction so as to move the bottom portion 17 of the multi-well plate 3 and the distal-end lens 19 of the immersion objective 7 away from each other while maintaining the liquid column F between the distal-end lens 19 and the bottom face 17a, as shown in FIG. 11, the controller 13 may control the liquid injecting device 11 to replenish liquid so as to replenish the liquid onto the distal-end lens 19 in accordance with the position of the immersion objective 7 in the optical-axis direction.

When the immersion objective 7 and the bottom portion 17 of the multi-well plate 3 are moved relative to each other in the direction closer to each other or in the direction away from each other, there are cases where the liquid column F retained therebetween collapses and is reduced to an amount less than the amount that is supposed to be retained, which compromises the reliability of retaining the liquid column F. According to this modification, in the case where the immersion objective 7 is moved in the optical-axis direction in accordance with the observing position of the sample S, as in the case where the upper portion or the lower portion of the sample S is observed, it is possible with the liquid injecting device 11 to maintain a suitable amount of liquid column F corresponding to the position of the immersion objective 7 in the optical-axis direction between the distal-end lens 19 and the bottom face 17a of the bottom portion 17 of the multi-well plate 3, which serves to improve the reliability of retaining the liquid column F.

Figure 12:
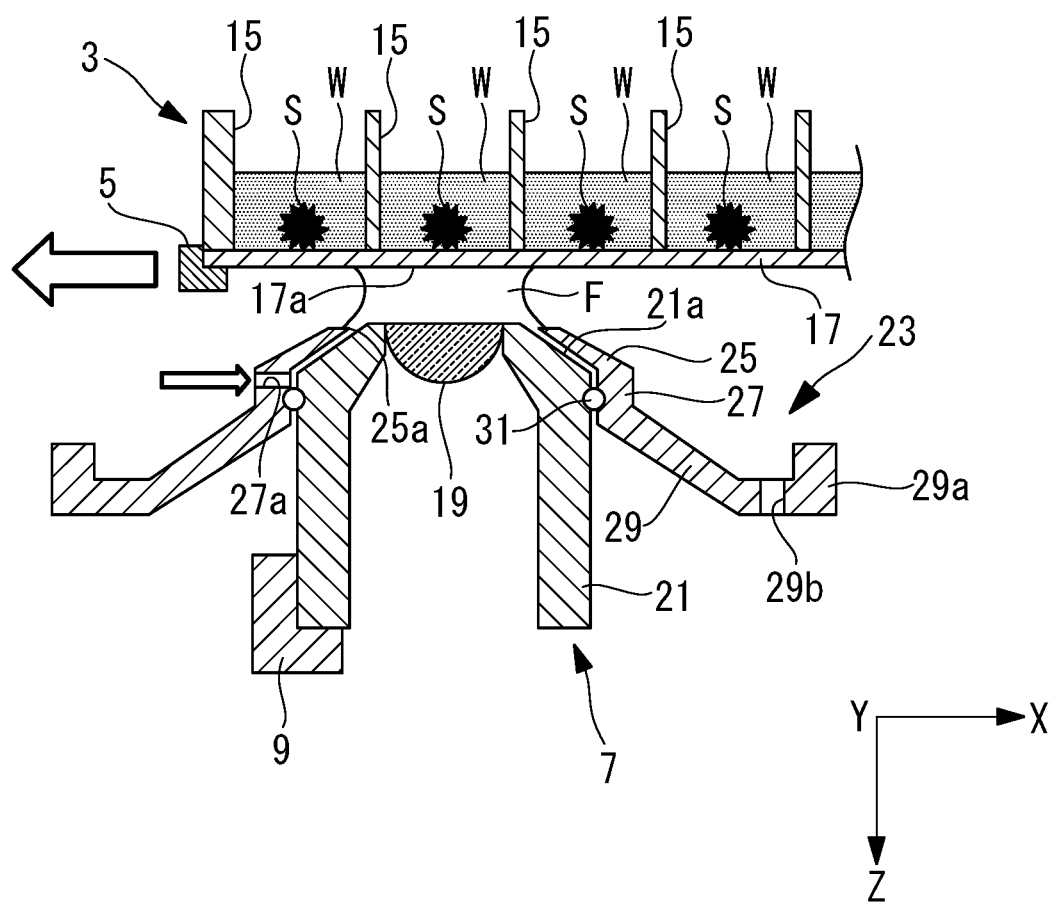
FIG. 12 is a vertical sectional view of the multi-well plate and the immersion objective, showing how the liquid is replenished onto the distal-end lens while shifting the multi-well plate and the immersion objective relative to each other in intersecting directions.

As a second modification, in the case where the controller 13 moves the XY stage 5 in directions intersecting the Z direction, e.g., the XY directions, to relatively shift the bottom portion 17 of the multi-well plate 3 and the immersion objective 7 in the state where the liquid column F has been formed between the immersion objective 7 and the bottom face 17a, as shown in FIG. 12, the controller 13 may control the liquid injecting device 11 to inject liquid so as to replenish the liquid onto the distal-end lens 19 in accordance with the amounts of movement of the XY stage 5 in the intersecting directions.

When the bottom portion 17 of the multi-well plate 3 and the immersion objective 7 are moved relative to each other in the intersecting directions in the state where the liquid column F has been formed between the distal-end lens 19 and the bottom face 17a, there are cases where the amount of the liquid column F decreases as a result of the liquid column F being dragged by the bottom face 17a of the bottom portion 17 of the multi-well plate 3. According to this modification, in the case where the XY stage 5 is moved in the intersecting directions in accordance with the observation point of the sample S or the position where the sample S to be observed is disposed, as in the case where a different position of the sample S in the XY directions is to be observed or the observation target is to be switched to another sample S accommodated in another one of the wells 15, it is possible with the liquid injecting device 11 to maintain a suitable amount of liquid column F between the bottom portion 17 of the multi-well plate 3 and the distal-end lens 19 of the immersion objective 7.

Although the embodiments of the present invention have been described above in detail with reference to the drawings, the specific configurations of the present invention are not limited to the embodiments, and the present invention encompasses design modifications, etc. that do not depart from the gist thereof. For example, without limitation to the application of the present invention in the forms of the above-described embodiments and modifications, the present invention may be applied in the forms of embodiments in which the above-described embodiments and modifications are combined as appropriate, without any particular limitation.

Furthermore, for example, although the alignment unit 9 moves the immersion objective 7 in the optical-axis direction in the above-described embodiments, the alignment unit 9 may move the XY stage 5 in the optical-axis direction of the immersion objective 7 or both the XY stage 5 and the immersion objective 7 in the optical-axis direction.

Furthermore, although the above embodiments have been described in the context of an example where the plurality of wells 15 are arrayed linearly in the multi-well plate 3, the array of the plurality of wells 15 is not limited to this example. Furthermore, a container constituted of a single well 15 may be adopted instead of the multi-well plate 3.

Although the above embodiments have been described in the context of an example where the multi-well plate 3 has a planar bottom face, it is not limited to this example. The multi-well plate 3 may have a spherical bottom face.

Furthermore, although the above embodiments have been described in the context of an example where the bottom member is the bottom portion 17 of the multi-well plate 3, alternatively, a glass plate or the like that allows a container such as the multi-well plate 3 to be mounted thereon may be adopted as the bottom member. In this case, for example, the XY stage 5 should have an opening for exposing the bottom face of the supported glass plate on the bottom side.

Accordingly, the following aspects are derived from the above-described embodiments.

A first aspect of the present invention is an inverted microscope including a retaining unit configured to support a bottom member and capable of retaining a sample above the bottom member, the bottom member being optically transparent; an immersion objective disposed facing vertically upward such that the distal end thereof faces the bottom face of the bottom member supported by the retaining unit; an alignment unit configured to move at least one of the retaining unit and the immersion objective in an optical-axis direction extending along the optical axis of the immersion objective; a liquid injecting unit configured to inject liquid between the bottom face of the bottom member and the distal end of the immersion objective; and a control unit configured to control the liquid injecting unit in a state where the bottom face of the bottom member and the distal end of the immersion objective are disposed with a gap therebetween in the optical-axis direction greater than the height of a droplet that can be formed on the distal end, with the aim of injecting the liquid onto the distal end to form the droplet, and to control the alignment unit with the aim of relatively bringing the bottom member and the immersion objective closer to each other in the optical-axis direction to bring the droplet on the distal end into contact with the bottom face of the bottom member, thereby forming a liquid column constituted of the liquid being in contact with the distal end and the bottom face, and moving the retaining unit and the immersion objective relative to each other in the optical-axis direction while maintaining the liquid column.

According to this aspect, when the alignment unit and the liquid injecting unit are controlled by the control unit to form a droplet on the distal end of the immersion objective in the state where the bottom member and the immersion objective are disposed with a gap therebetween in the optical-axis direction greater than the height of the droplet formed on the distal end of the immersion objective, the bottom member and the immersion objective are relatively brought closer to each other in the optical-axis direction until a liquid column is formed by the droplet on the distal end coming into contact with the bottom face of the bottom member, and the retaining unit and the immersion objective are moved relative to each other in the optical-axis direction while maintaining the liquid column.

Thus, the focal position of the immersion objective is adjusted on the sample retained above the bottom member by the retaining unit, and light emitted from the focal position of the immersion objective at the sample is collected by the immersion objective via the liquid column filling the gap between the bottom member and the immersion objective, which enables the observation of the sample. Accordingly, it is possible to attain a desired alignment precision with a simple structure and simple operations of just moving the retaining unit and the immersion objective relative to each other in the optical-axis direction by the alignment unit and injecting liquid between the bottom member and the immersion objective by the liquid injecting unit, which enables the observation of 3D cultured cells having a considerable thickness, such as spheroid or organoid.

A second aspect of the present invention is an inverted microscope including a retaining unit configured to support a bottom member and capable of retaining a sample above the bottom member, the bottom member being optically transparent; an immersion objective disposed facing vertically upward such that the distal end thereof faces the bottom face of the bottom member supported by the retaining unit; an alignment unit configured to move at least one of the retaining unit and the immersion objective in an optical-axis direction extending along the optical axis of the immersion objective; a liquid injecting unit configured to inject liquid between the bottom face of the bottom member and the distal end of the immersion objective; and a control unit configured to control the liquid injecting unit in a state where the bottom face of the bottom member and the distal end of the immersion objective are disposed with a gap therebetween in the optical-axis direction less than the height of a droplet that can be formed on the distal end, with the aim of injecting the liquid onto the distal end to form a liquid column constituted of the liquid being in contact with the distal end and the bottom face, and to control the alignment unit with the aim of moving the retaining unit and the immersion objective relative to each other in the optical-axis direction while maintaining the liquid column.

According to this aspect, when the alignment unit and the liquid injecting unit are controlled by the control unit to form a liquid column being in contact with the bottom face of the bottom member on the distal end of the immersion objective in the state where the bottom member and the immersion objective are disposed with a gap therebetween in the optical-axis direction less than the height of the droplet that is formed on the distal end of the immersion objective, the retaining unit and the immersion objective are moved relative to each other in the optical-axis direction while maintaining the liquid column.

Thus, the focal position of the immersion objective is adjusted on the sample retained above the bottom member by the retaining unit, and light emitted from the focal position of the immersion objective at the sample is collected by the immersion objective via the liquid column filling the gap between the bottom member and the immersion objective, which enables the observation of the sample. Accordingly, it is possible to attain a desired alignment precision with a simple structure and simple operations of just moving the retaining unit and the immersion objective relative to each other in the optical-axis direction by the alignment unit and injecting liquid between the bottom member and the immersion objective by the liquid injecting unit, which enables the observation of 3D cultured cells having a considerable thickness, such as spheroid or organoid.

Furthermore, since it is possible to form a liquid column while retaining the liquid column with both the distal end of the immersion objective and the bottom face of the bottom member, it is possible to attain a greater retaining force compared with the case where a droplet retained only by the distal end of the immersion objective is formed. Accordingly, it is possible to form a sufficient amount of liquid column between the bottom member and the immersion objective by increasing the amount of liquid injected onto the distal end of the immersion objective.

In the above first and second aspects, the control unit may be configured to control the liquid injecting unit with the aim of replenishing the liquid onto the distal end before or while moving the retaining unit and the immersion objective relative to each other in the optical-axis direction by the alignment unit while maintaining the liquid column.

In the state where the droplet on the distal end of the immersion objective is in contact with the bottom face of the bottom member, the retaining force increases compared with the case where the droplet is retained only by the distal end of the immersion objective, and thus the amount of liquid that can be contained in the liquid column increases. Accordingly, with the above configuration, it is possible to observe the sample S with a sufficient amount of liquid column provided between the bottom member and the immersion objective.

In the above first and second aspects, the inverted microscope may further include a liquid discharging unit that discharges the liquid stored between the distal end of the immersion objective and the bottom face of the bottom member, and the control unit may control the liquid discharging unit with the aim of reducing the amount of the liquid on the distal end in the case where the retaining unit and the immersion objective are moved relative to each other in the optical-axis direction by the alignment unit so as to bring the bottom member and the immersion objective closer to each other while maintaining the liquid column, and the control unit may control the liquid injecting unit with the aim of replenishing the liquid onto the distal end in the case where the retaining unit and the immersion objective are moved relative to each other in the optical-axis direction by the alignment unit so as to move the bottom member and the immersion objective away from each other while maintaining the liquid column.

When the bottom member and the immersion objective are moved relative to each other in the direction closer to each other or in the direction away from each other, there are cases where the liquid column retained therebetween collapses and is reduced to an amount less than the amount that is supposed to be retained, which compromises the reliability of retaining the liquid column. With the above configuration, in the case where the retaining unit and the immersion objective are moved relative to each other in the optical-axis direction in accordance with the observation point of the sample, it is possible to maintain a suitable amount of liquid column between the bottom member and the immersion objective by the liquid injecting unit and the liquid discharging unit, which serves to improve the reliability of retaining the liquid column.

In the above first and second aspects, the liquid injecting unit and the liquid discharging unit may be driven by a mutually common driving source.

With the above configuration, a single driving source suffices for the liquid injecting unit and the liquid discharging unit, which prevents the structure from becoming complex even in the case where the liquid discharging unit is provided. The driving source may be a peristaltic pump.

In the first and second aspects, the retaining unit may be provided so as to be movable in an intersecting direction intersecting the optical-axis direction, and the control unit may control the liquid injecting unit with the aim of replenishing the liquid onto the distal end in the case where the retaining unit is moved in the intersecting direction to shift the bottom member and the immersion objective relative to each other in the intersecting direction in the state where the liquid column has been formed.

When the bottom member and the immersion objective are moved relative to each other in the intersecting direction in the state where the liquid column has been formed between the immersion objective and the bottom member, there are cases where the amount of the liquid column on the distal end of the immersion objective decreases as a result of the liquid column being dragged by the bottom face of the bottom member. With the above configuration, in the case where the retaining unit is moved in the intersecting direction in accordance with the observation point of the sample, it is possible to maintain a suitable amount of liquid column between the bottom member and the immersion objective by the liquid injecting unit.

In the above first and second aspects, the distance from the distal end of the immersion objective to the focal position thereof may be longer than the height of the droplet that can be formed on the distal end.

With the above configuration, it is possible to observe the entire 3D cultured cells having a considerable thickness, such as spheroid or organoid. The distance from the distal end of the immersion objective to the focal position thereof may be not less than 1.5 mm.

A third aspect of the present invention is a sample observation method including a droplet forming step of, in a state where a bottom member that retains a sample thereabove and that is optically transparent and an immersion objective that is disposed facing vertically upward with the distal end thereof facing the bottom face of the bottom member are disposed with a gap therebetween greater than the height of a droplet that can be formed on the distal end of the immersion objective, injecting liquid onto the distal end to form the droplet; a liquid-column forming step of relatively bringing the bottom member and the immersion objective closer to each other in an optical-axis direction extending along the optical axis of the immersion objective to bring the droplet formed on the distal end into contact with the bottom face of the bottom member, thereby forming a liquid column constituted of the liquid being in contact with the distal end and the bottom face; and a focal-position adjusting step of moving the bottom member and the immersion objective relative to each other in the optical-axis direction, while maintaining the liquid column, to adjust the focal position of the immersion objective on the sample retained above the bottom member.

According to this aspect, a droplet is formed on the distal end of the immersion objective in the droplet forming step in the state where the bottom member and the immersion objective are disposed with a gap therebetween in the optical-axis direction greater than the height of the droplet formed on the distal end of the immersion objective, and then the bottom member and the immersion objective are relatively brought closer to each other in the optical-axis direction until a liquid column is formed by the droplet on the distal end of the immersion objective coming into contact with the bottom face of the bottom member in the liquid-column forming step. Then, in the focal-position adjusting step, the bottom member and the immersion objective are moved relative to each other in the optical-axis direction while maintaining the liquid column until the focal position of the immersion objective is adjusted on the sample retained above the bottom member.

Thus, light emitted from the focal position of the immersion objective at the sample is collected by the immersion objective via the liquid column filling the gap between the bottom member and the immersion objective, which enables the observation of the sample. Accordingly, it is possible to attain a desired alignment precision with a simple structure and simple operations of just moving the bottom member and the immersion objective relative to each other in the optical-axis direction and injecting liquid between the bottom member and the immersion objective, which enables the observation of 3D cultured cells having a considerable thickness, such as spheroid or organoid.

A fourth aspect of the present invention is a sample observation method including a liquid-column forming step of, in a state where a bottom member that retains a sample thereabove and that is optically transparent and an immersion objective that is disposed facing vertically upward with the distal end thereof facing the bottom face of the bottom member are disposed with a gap therebetween less than the height of a droplet that can be formed on the distal end of the immersion objective, injecting liquid onto the distal end to form a liquid column constituted of the liquid being in contact with the distal end and the bottom face of the bottom member; and a focal-position adjusting step of moving the bottom member and the immersion objective relative to each other in an optical-axis direction extending along the optical axis of the immersion objective, while maintaining the liquid column, to adjust the focal position of the immersion objective on the sample retained above the bottom member.

According to this aspect, a liquid column being in contact with the bottom face of the bottom member is formed on the distal end of the immersion objective in the liquid-column forming step in the state where the bottom member and the immersion objective are disposed with a gap therebetween in the optical-axis direction less than the height of the droplet formed on the distal end of the immersion objective, and then the bottom member and the immersion objective are moved relative to each other in the optical-axis direction while maintaining the liquid column until the focal position of the immersion objective is adjusted on the sample retained above the bottom member in the focal-position adjusting step.

Thus, light emitted from the focal position of the immersion objective at the sample is collected by the immersion objective via the liquid column filling the gap between the bottom member and the immersion objective, which enables the observation of the sample. Accordingly, it is possible to attain a desired alignment precision with a simple structure and simple operations of just moving the bottom member and the immersion objective relative to each other in the optical-axis direction and injecting liquid therebetween, which enables the observation of 3D cultured cells having a considerable thickness, such as spheroid or organoid.

Furthermore, since it is possible to form a liquid column while retaining the liquid column with both the distal end of the immersion objective and the bottom face of the bottom member, it is possible to attain a greater retaining force compared with the case where a droplet retained only by the distal end of the immersion objective is formed. Accordingly, it is possible to form a sufficient amount of liquid column between the bottom member and the immersion objective by increasing the amount of liquid injected onto the distal end of the immersion objective.

In the above third and fourth aspects, the liquid may be replenished onto the distal end of the immersion objective before or while moving the bottom member and the immersion objective relative to each other in the optical-axis direction in the focal-position adjusting step.

In the state where a liquid column has been formed between the immersion objective and the bottom member, the retaining force increases compared with the case where the droplet is retained only by the distal end of the immersion objective, and thus the amount of liquid that can be contained in the liquid column increases. Accordingly, with the above configuration, it is possible to observe the sample with a sufficient amount of liquid column provided between the bottom member and the immersion objective.

In the above third and fourth aspects, the amount of the liquid on the distal end may be reduced in the case where the bottom member and the immersion objective are moved relatively in a direction closer to each other while maintaining the liquid column, and the liquid may be replenished onto the distal end in the case where the bottom member and the immersion objective are moved relatively in a direction away from each other while maintaining the liquid column.

With the above configuration, in the case where the bottom member and the immersion objective are moved relatively in the direction closer to each other or in the direction away from each other in accordance with the observation point of the sample, it is possible to maintain a suitable amount of liquid column between the bottom member and the immersion objective, which serves to improve the reliability of retaining the liquid column.

In the above third and fourth aspects, the liquid may be replenished onto the distal end of the immersion objective in the case where the bottom member and the immersion objective are shifted relative to each other in the intersecting direction in the state where the liquid column has been formed.

With the above configuration, in the case where the retaining unit and the immersion objective are moved relative to each other in the intersecting direction in accordance with the observation point of the sample, it is possible to maintain a suitable amount of liquid column between the bottom member and the immersion objective by the liquid injecting unit.

According to the present invention, an advantage is afforded in that it is possible to attain a desired alignment precision with a simple structure and simple operations, which enables the observation of 3D cultured cells having a considerable thickness, such as spheroid or organoid.

REFERENCE SIGNS LIST

1 Inverted microscope
5 XY stage (retaining unit)
7 Immersion objective
9 Alignment unit
11 Liquid injecting device (liquid injecting unit and liquid discharging unit)
13 Controller
19 Distal-end lens (distal end)
SA1, SB1 Gap adjusting step (droplet forming step)
SA2 Liquid injecting step (droplet forming step)
SA3, SB2 Liquid-column forming step
SA4, SB3 Focal-position adjusting step

The invention claimed is:
1. An inverted microscope comprising:
a stage configured to support directly or indirectly a bottom member and capable of retaining a sample above the bottom member, the bottom member being optically transparent;
an immersion objective disposed facing vertically upward such that a distal end thereof faces a bottom face of the bottom member supported by the stage;
an alignment unit configured to move at least one of the stage and the immersion objective in an optical-axis direction extending along an optical axis of the immersion objective;
a liquid injecting unit configured to inject liquid between the bottom face of the bottom member and the distal end of the immersion objective;
a liquid discharging unit that discharges the liquid from between the distal end of the immersion objective and the bottom face of the bottom member; and
a controller configured to control the liquid injecting unit, in a state where the bottom face of the bottom member and the distal end of the immersion objective are disposed with a gap therebetween in the optical-axis direction greater than a height of a droplet that can be formed on the distal end, so as to inject the liquid onto the distal end to form the droplet, and to control the alignment unit so as to relatively bring the bottom member and the immersion objective closer to each other in the optical-axis direction to bring the droplet on the distal end into contact with the bottom face of the bottom member, thereby forming a liquid column constituted of the liquid being in contact with the distal end and the bottom face,
wherein the controller is configured to perform control to move the stage and the immersion objective relative to each other in the optical-axis direction while maintaining the liquid column, and
wherein the controller controls the liquid discharging unit so as to reduce an amount of the liquid on the distal end in a case where the stage and the immersion objective are moved relative to each other in the optical-axis direction by the alignment unit so as to bring the bottom member and the immersion objective closer to each other while maintaining the liquid column, and the controller controls the liquid injecting unit so as to replenish the liquid onto the distal end in a case where the stage and the immersion objective are moved relative to each other in the optical-axis direction by the alignment unit so as to move the bottom member and the immersion objective away from each other while maintaining the liquid column.

2. An inverted microscope according to claim 1, wherein the liquid injecting unit and the liquid discharging unit are driven by a mutually common driving source.

3. An inverted microscope according to claim 2, wherein the driving source is a peristaltic pump.

4. An inverted microscope according to claim 1, wherein the stage is provided so as to be movable in an intersecting direction intersecting the optical-axis direction, and
   wherein the controller controls the liquid injecting unit so as to replenish the liquid onto the distal end in a case where the stage is moved in the intersecting direction to shift the bottom member and the immersion objective relative to each other in the intersecting direction in the state where the liquid column has been formed.

5. An inverted microscope according to claim 1, wherein a distance from the distal end of the immersion objective to a focal position thereof is longer than the height of the droplet that can be formed on the distal end.

6. An inverted microscope according to claim 1, wherein a distance from the distal end of the immersion objective to a focal position thereof is not less than 1.5 mm.

7. A sample observation method comprising:
   a droplet forming step of, in a state where a bottom member that retains a sample thereabove and that is optically transparent and an immersion objective that is disposed facing vertically upward with a distal end thereof facing a bottom face of the bottom member are disposed with a gap therebetween greater than a height of a droplet that can be formed on the distal end of the immersion objective, injecting liquid onto the distal end to form the droplet;
   a liquid-column forming step of relatively bringing the bottom member and the immersion objective closer to each other in an optical-axis direction extending along an optical axis of the immersion objective to bring the droplet formed on the distal end into contact with the bottom face of the bottom member, thereby forming a liquid column constituted of the liquid being in contact with the distal end and the bottom face; and
   a focal-position adjusting step of moving the bottom member and the immersion objective relative to each other in the optical-axis direction, while maintaining the liquid column, to adjust a focal position of the immersion objective on the sample retained above the bottom member,
   wherein an amount of the liquid on the distal end is reduced in a case where the bottom member and the immersion objective are moved relatively in a direction closer to each other while maintaining the liquid column, and the liquid is replenished onto the distal end in a case where the bottom member and the immersion objective are moved relatively in a direction away from each other while maintaining the liquid column.

8. A sample observation method according to claim 7, wherein the liquid is replenished onto the distal end of the immersion objective in a case where the bottom member and the immersion objective are shifted relative to each other in an intersecting direction intersecting the optical-axis direction in the state where the liquid column has been formed.

* * * * *